(12) United States Patent
Hara

(10) Patent No.: US 9,791,914 B2
(45) Date of Patent: Oct. 17, 2017

(54) RETURNING BACK TO NORMAL POWER MODE ONLY AFTER COMPLETING A TRANSITION TO A POWER SAVING MODE BY AN IMAGE FORMING APPARATUS

(71) Applicant: CANON KABUSHIKI KAISHA, Tokyo (JP)

(72) Inventor: Kenji Hara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 14/303,171

(22) Filed: Jun. 12, 2014

(65) Prior Publication Data
US 2014/0380077 A1 Dec. 25, 2014

(30) Foreign Application Priority Data
Jun. 24, 2013 (JP) .................................. 2013-131321

(51) Int. Cl.
*G06F 1/32* (2006.01)

(52) U.S. Cl.
CPC .......... *G06F 1/3284* (2013.01); *G06F 1/3209* (2013.01); *Y02B 60/1267* (2013.01)

(58) Field of Classification Search
CPC .............................. G06F 1/3209; G06F 1/3287
USPC ........................................................ 713/323
See application file for complete search history.

(56) References Cited

U.S. PATENT DOCUMENTS

| 4,953,405 A | 9/1990 | Hara et al. |
| 5,301,552 A | 4/1994 | Nagura et al. |
| 5,381,693 A | 1/1995 | Kobayashi et al. |
| 6,292,266 B1 | 9/2001 | Narahara |
| 7,555,056 B2 | 6/2009 | Hara et al. |
| 7,721,126 B2 | 5/2010 | Mashimo et al. |
| 7,873,848 B2 | 1/2011 | Nakahara et al. |
| 8,406,699 B2 | 3/2013 | Mashimo et al. |

(Continued)

FOREIGN PATENT DOCUMENTS

| CN | 102778943 | 11/2012 |
| JP | H11-194846 | 7/1997 |

(Continued)

OTHER PUBLICATIONS

Chinese Office Action dated Nov. 30, 2016 in corresponding Chinese Application No. 201410280831.9 (with full English-language Translation).

(Continued)

*Primary Examiner* — Thomas Lee
*Assistant Examiner* — Santosh R Poudel
(74) *Attorney, Agent, or Firm* — Fitzpatrick, Cella, Harper & Scinto

(57) ABSTRACT

It is an object to enable a request received from an outside to be automatically processed immediately before shifting to a power saving state such as a suspend state. On the way of a shift from a normal state to the suspend state and in a state where the shift cannot be interrupted, when a predetermined request such as a print job is received from an external interface, an MFP reserves a return to the normal state by turning on a wake-up reservation flag and continues a suspend process. When shifting to the suspend state, if the wake-up reservation flag is ON, a power supply control unit performs a return (resume) to the normal state even if no wake-up factor occurs.

9 Claims, 6 Drawing Sheets

(56) References Cited

U.S. PATENT DOCUMENTS

| | | |
|---|---|---|
| 8,527,790 B2 | 9/2013 | Nakahara et al. |
| 8,793,367 B2 | 7/2014 | Hara |
| 9,253,344 B2* | 2/2016 | Utsumi ............... H04N 1/00411 |
| 9,571,673 B2* | 2/2017 | Inaba ................. H04N 1/00204 |
| 2005/0216776 A1* | 9/2005 | Watanabe ............ G06F 1/3209 |
| | | 713/300 |
| 2006/0236143 A1* | 10/2006 | Kidoguchi ............ G06F 1/325 |
| | | 713/320 |
| 2007/0260358 A1 | 11/2007 | Katoh |
| 2011/0026062 A1* | 2/2011 | Takatani ........... G06F 11/0757 |
| | | 358/1.13 |
| 2011/0037999 A1* | 2/2011 | Sano ................ G03G 15/5012 |
| | | 358/1.15 |
| 2011/0208986 A1* | 8/2011 | Soga ................ G03G 15/5004 |
| | | 713/323 |
| 2013/0086416 A1* | 4/2013 | Kopylovitz ......... G06F 11/0727 |
| | | 714/6.11 |
| 2013/0103964 A1* | 4/2013 | Peveling .............. G06F 1/305 |
| | | 713/323 |
| 2013/0151880 A1 | 6/2013 | Hara |
| 2014/0032947 A1* | 1/2014 | Ahmad ................ G06F 9/4418 |
| | | 713/320 |

FOREIGN PATENT DOCUMENTS

| | | |
|---|---|---|
| JP | 2000-284974 | 10/2000 |
| JP | 2000-284974 A | 10/2000 |
| JP | 2001-100968 | 4/2001 |
| JP | 2007-296723 | 11/2007 |

OTHER PUBLICATIONS

Japanese Office Action issued Jan. 17, 2017 during prosecution of related Japanese application No. 2013-131321.

Japanese Office Action dated Apr. 25, 2017 during prosecution of related Japanese application No. 2013-131321.

Chinese Office Action dated Jul. 28, 2017 during prosecution of related Chinese application No. 201410280831.9.

\* cited by examiner

RETURNING BACK TO NORMAL POWER MODE ONLY AFTER COMPLETING A TRANSITION TO A POWER SAVING MODE BY AN IMAGE FORMING APPARATUS

BACKGROUND OF THE INVENTION

Field of the Invention

The present invention relates to control of an information processing apparatus such as an image forming apparatus or the like which can switch a plurality of electric power states and can operate.

Description of the Related Art

In information processing apparatuses such as an image forming apparatus and the like in recent years, there is an apparatus having a function called "suspend" in which the operation of a program being executed or the like is set into a rest state so that electric power consumption when the apparatus is not used is reduced and that the apparatus can be returned in an operating state similar to a current operating state. There is also an apparatus having a function called "resume" in which the apparatus is returned to a state immediately before the operation is rested by a user's operation or a request such as a print job or the like from a network.

According to the foregoing suspend function, in the state immediately before the operation is rested, a device driver of a kernel stores a state of the device into a memory and each service is interrupted. According to the resume function, by returning the state of the device stored in the memory before, states of almost all devices can be returned to the states immediately before and the apparatus can be returned the state immediately before the operation is rested.

According to Japanese Patent Application Laid-Open No. 2000-284974, in a device such as a network or the like which has to be operated even in suspend, an interruption which was being processed by software is switched to hardware which operates in suspend, thereby enabling a service to be continued even in suspend.

According to the image forming apparatus in the related art, for example, a print job which is transmitted from an external host PC (personal computer) through a network can be recognized as a print job for the first time by processing a plurality of network packets (hereinbelow, referred to as packets) by software. However, in the image forming apparatus, if the packet is received immediately before the apparatus enters a suspend mode, there is a case where the apparatus enters the suspend mode before the packet is analyzed and recognized as a print job. In such a case, if the remaining packets are transmitted from the host PC, the image forming apparatus receives them, is returned from the suspend mode, and can restart an analyzing process of the packet.

However, in the case of a very small print job, there is a possibility that the packet transmission from the host PC has already been finished. In such a case, it is not guaranteed that a new packet is transmitted from the host PC. Therefore, in the image forming apparatus, there is a possibility that the suspend mode is maintained and the analyzing process itself of the packet is stopped. In this case, there is a possibility of occurrence of such a phenomenon that in spite of a fact that the transmission of the print job from the host PC has already been completed, the image forming apparatus enters the suspend state while holding the packet and a printing is not performed at all. In this case, although the printing of the job can be performed by returning the apparatus by directly operating the apparatus by the user or the like, it is troublesome for the user. A case where since the printing is not performed, the user transmits the job again is considered. However, in this case, the printing of both of the job which had been transmitted before and the job which was transmitted again is performed irrespective of a user's intention.

The invention is made to solve the foregoing problem. It is an aspect of the invention to provide such a mechanism that a request received from an outside immediately before an apparatus is shifted to a power saving state such as a suspend state or the like can be automatically processed without causing a troublesomeness to the user.

SUMMARY OF THE INVENTION

According to an aspect of the invention, there is provided an information processing apparatus which is shifted to a first power state and a second power state in which electric power consumption is smaller than that in the first power state, comprising: a shift unit configured to shift the information processing apparatus from the first power state to the second power state in the case where a shift event for shifting to the second power state occurs in the first power state; a return unit configured to return the information processing apparatus from the second power state to the first power state in the case where a return event for returning to the first power state occurs in the second power state; and a reservation unit configured to make a reservation for returning the information processing apparatus from the second power state to the first power state in the case where the return event occurs while the information processing apparatus is being shifted from the first power state to the second power state by the shift unit, wherein in the case where the return event occurs while the information processing apparatus is being shifted from the first power state to the second power state by the shift unit, the shift unit shifts the information processing apparatus to the second power state, and in the case where the reservation is made by the reservation unit, the return unit returns the information processing apparatus from the second power state to the first power state without the occurrence of the return event.

According to the invention, the request received from the outside immediately before the apparatus is shifted to the power saving state such as a suspend state or the like can be automatically processed without causing a troublesomeness to the user.

Further features of the present invention will become apparent from the following description of exemplary embodiments with reference to the attached drawings.

DESCRIPTION OF THE EMBODIMENTS

An embodiment of the invention will be described in detail hereinbelow with reference to the drawings.

Figure 1:
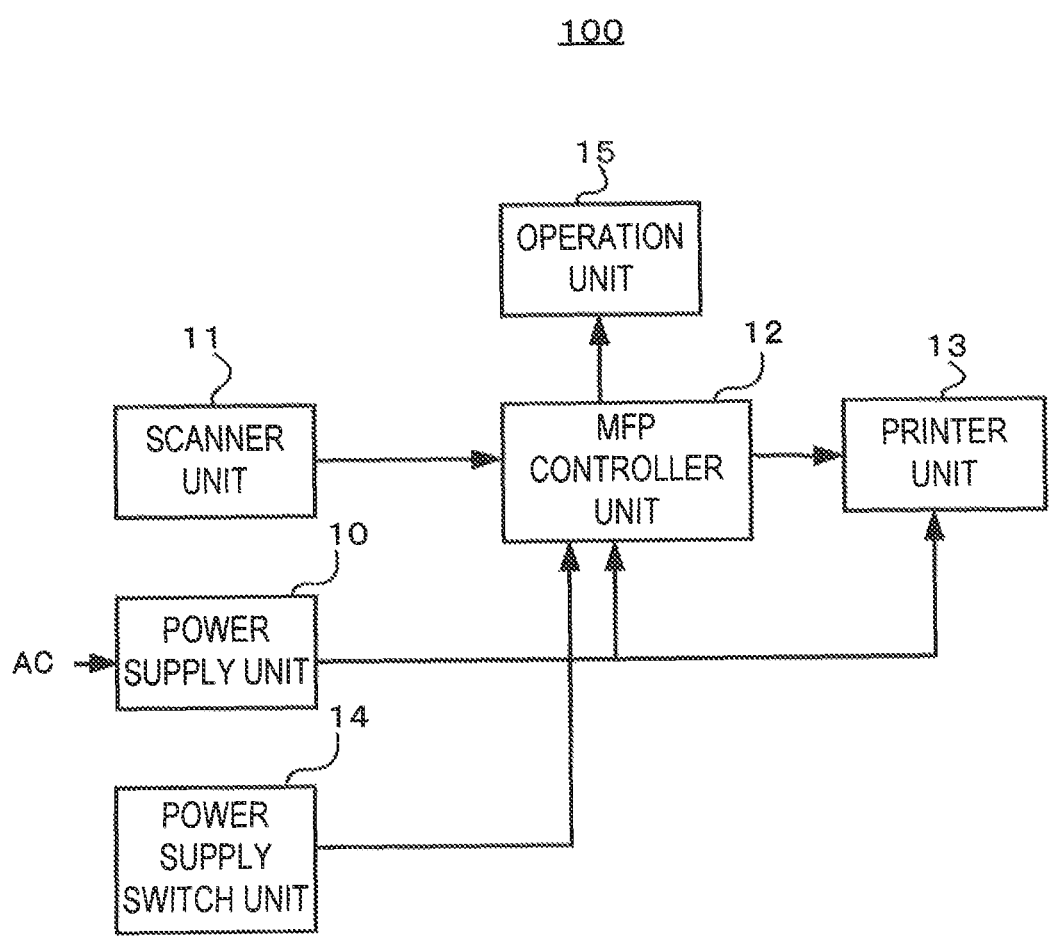
FIG. 1 is a diagram illustrating an example of a schematic construction of an image forming apparatus showing an information processing apparatus of the invention.

FIG. 1 is a diagram illustrating an example of a schematic construction of an image forming apparatus showing an embodiment of an information processing apparatus of the invention.

In FIG. 1, an image forming apparatus 100 (hereinbelow, referred to as MFP) has a hybrid function such as copy function, printer function, scanner function, and the like.

An MFP controller unit 12 controls the whole MFP. A scanner unit 11 optically reads an image from an original and converts into a digital image. A printer unit 13 executes an image forming process in accordance with, for example, an electro photographic method. A recording method of the printer unit 13 is not limited to the electro photographic method so long as the image forming process can be executed to a sheet-like recording medium (for example, recording paper) but another recording method such as ink jet method, thermal transfer method, or the like may be used.

A power supply unit 10 supplies an electric power supplied from an AC power source to each unit of the MFP 100. An operation unit 15 is a user interface for performing the operation of the MFP 100. A power supply switch unit 14 is a switch which can perform an ON/OFF operation of a power source by the user and switches a power supply state of the MFP 100.

Figure 2:
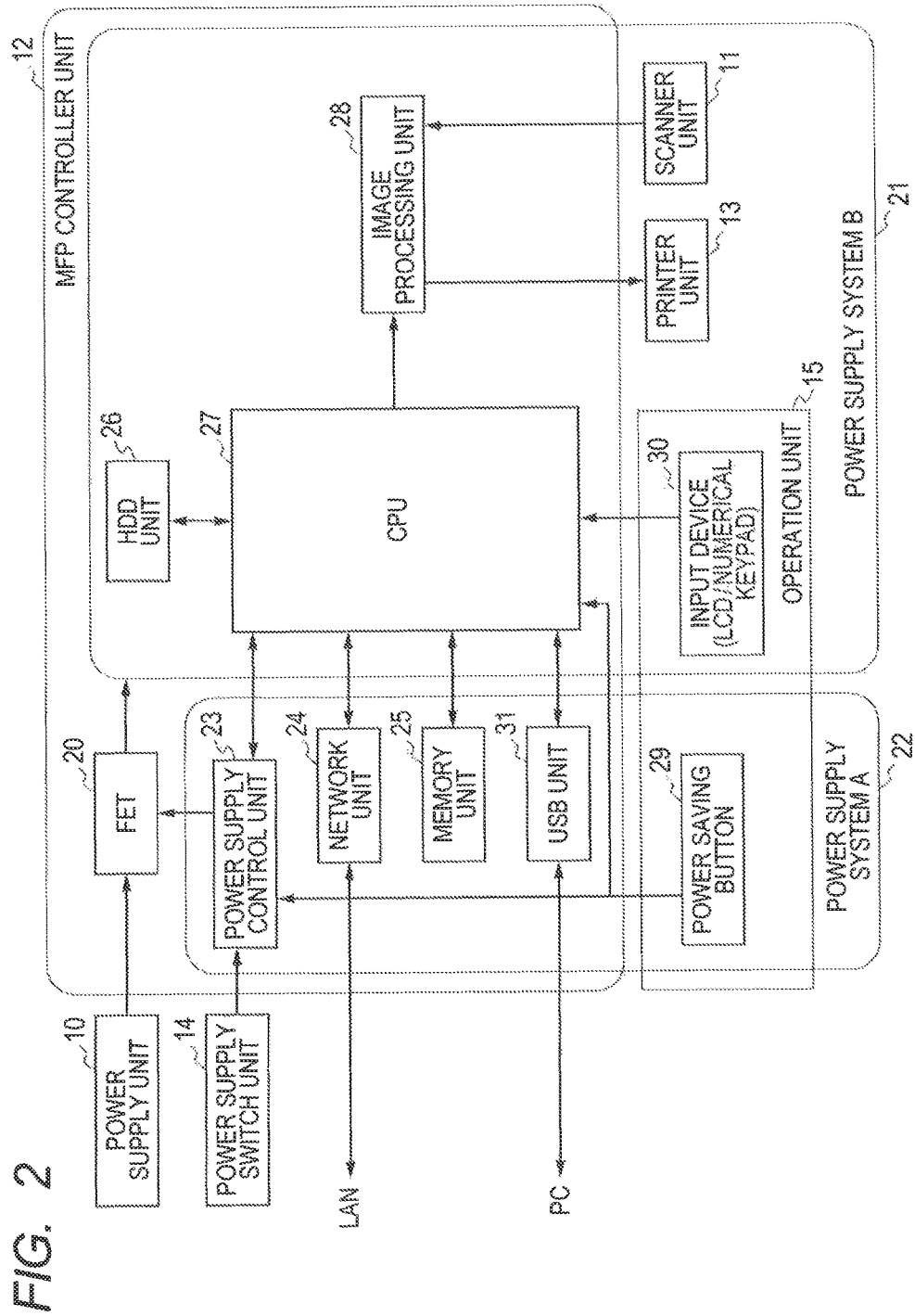
FIG. 2 is a diagram illustrating an example of a schematic construction of an MFP (multifunction peripheral) controller unit.

FIG. 2 is a diagram illustrating an example of a schematic construction of the MFP controller unit 12. A description of the component elements designated by the reference numerals already mentioned above is omitted hereinbelow.

In FIG. 2, a power supply control unit 23 has such a function that when it is detected that the power supply switch unit 14 has been operated or a power saving button 29 arranged on the operation unit 15 has been operated, a CPU 27 is notified of it as an interruption. The power supply control unit 23 controls in such a manner that when the MFP is shifted to a power saving mode, a supply of a power source to a power supply system B 21, which will be described hereinafter, is shut off and, when the MFP is returned from the power saving mode, a power source is supplied to the power supply system B. An FET (field-effect transistor) 20 is constructed by, for example, an field effect transistor and is a switch for turning on or off the power supply to the power supply system B 21 in response to a signal from the power supply control unit 23.

The CPU 27 is a control unit for controlling the whole MFP 100. A memory unit 25 is a volatile memory such as a DDR-SDRAM (double data rate-synchronous dynamic random access memory) or the like. An image processing unit 28 is a control unit for executing such a process that data from the scanner unit 11 is compressed, image data processed by the CPU 27 is output to the printer unit 13, or the like. An HDD (hard disk drive) unit 26 is an external storage device and is, for example, an (hard disk drive), an SSD (solid state drive), or the like.

The operation unit 15 has the power saving button 29, an input device (LCD (liquid crystal display) panel/numerical keypad) 30, and the like and can be operated by the user. A network unit 24 is one of external interfaces (hereinbelow, referred to as external I/F (interface)) of the MFP 100 and can receive a print request from an external PC (personal computer) or the like (not shown) through a network. A USB (universal serial bus) unit 31 is also one of the external I/F of the MFP 100 and can receive the print request from the external PC or the like (not shown) through a USB cable.

Subsequently, a power supply system of the MFP controller unit 12 will be described. The embodiment shows a case where a suspend method whereby data is held in a memory as a state where electric power consumption is smaller than that in a normal state and an activation time is a high speed time is applied as a power saving function. However, another method such as a hibernation method or the like may be used as a power saving function.

As mentioned above, if a predetermined power saving shift factor occurs, the MFP 100 stores a state (first state) of the MFP 100 at the time when the occurrence of the power saving shift factor is detected into the memory unit 25 and shifts to a second state. The second state denotes a state of the MFP 100 where if a predetermined wake-up factor occurs, the MFP can be returned to the first state. In the embodiment, it is assumed that the first state is a normal state and the second state is a suspend state. The suspend state corresponds to a power saving state. As mentioned above, an electric power consumption amount of the MFP 100 in the suspend state is smaller than that of the MFP 100 in the normal state.

The case where the predetermined power saving shift factor occurred corresponds to, for example, a case where an OFF operation of the power supply switch unit 14 or a depression operation of the power saving button 29 has been detected, a case where there is no input from the input device 30 for a predetermined time, or the like. The case where the predetermined wake-up factor occurred corresponds to, for example, a case where an event such as case where an ON operation of the power supply switch unit 14 or the depression operation of the power saving button 29 has been detected, case where a predetermined request such as a job or the like has been input from the network unit 24 or the USB unit 31, or the like is detected.

The power supply system B 21 is a power supply system for supplying a power source to the CPU 27, image processing unit 28, HDD unit 26, operation unit 15 (other than the power saving button 29), scanner unit 11, printer unit 13, and the like. Control of shut-off/supply of the power source of the power supply system B 21 is realized by controlling the FET 20 by a control signal which is output from the power supply control unit 23.

A power supply system A 22 is a power supply system for supplying a power source to the power supply control unit 23, network unit 24, memory unit 25, USB unit 31, power saving button 29, and the like. In both of the first state and the second state, the power source is supplied to the power supply system A 22 from the power supply unit 10. The MFP 100 switches a plurality of power states, that is, switches at least the normal state and the suspend state where the electric power consumption is smaller than that in the normal state and can operate. That is, even in the suspend state, the network unit 24 and the USB unit 31 can communicate with the outside.

A sequence of the suspend process will be described hereinbelow with reference to FIGS. 3 and 6.

Figure 3:
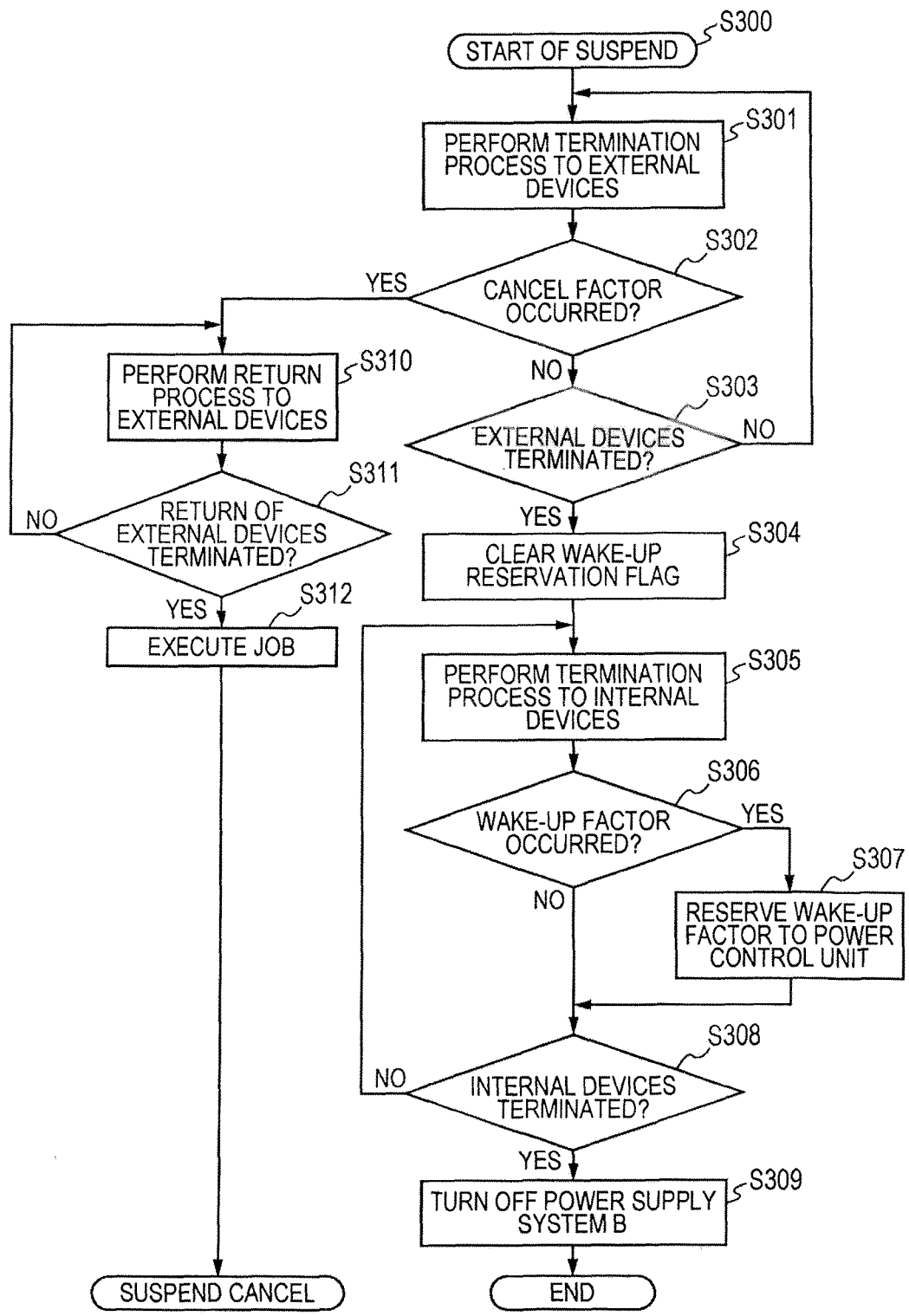
FIG. 3 is a flowchart illustrating an example of a suspend process.

FIG. 3 is a flowchart illustrating an example of the suspend process in the embodiment. The suspend process is realized by a method whereby the CPU 27 reads out a program recorded in the HDD unit 26 or the like and executes.

Figure 6:
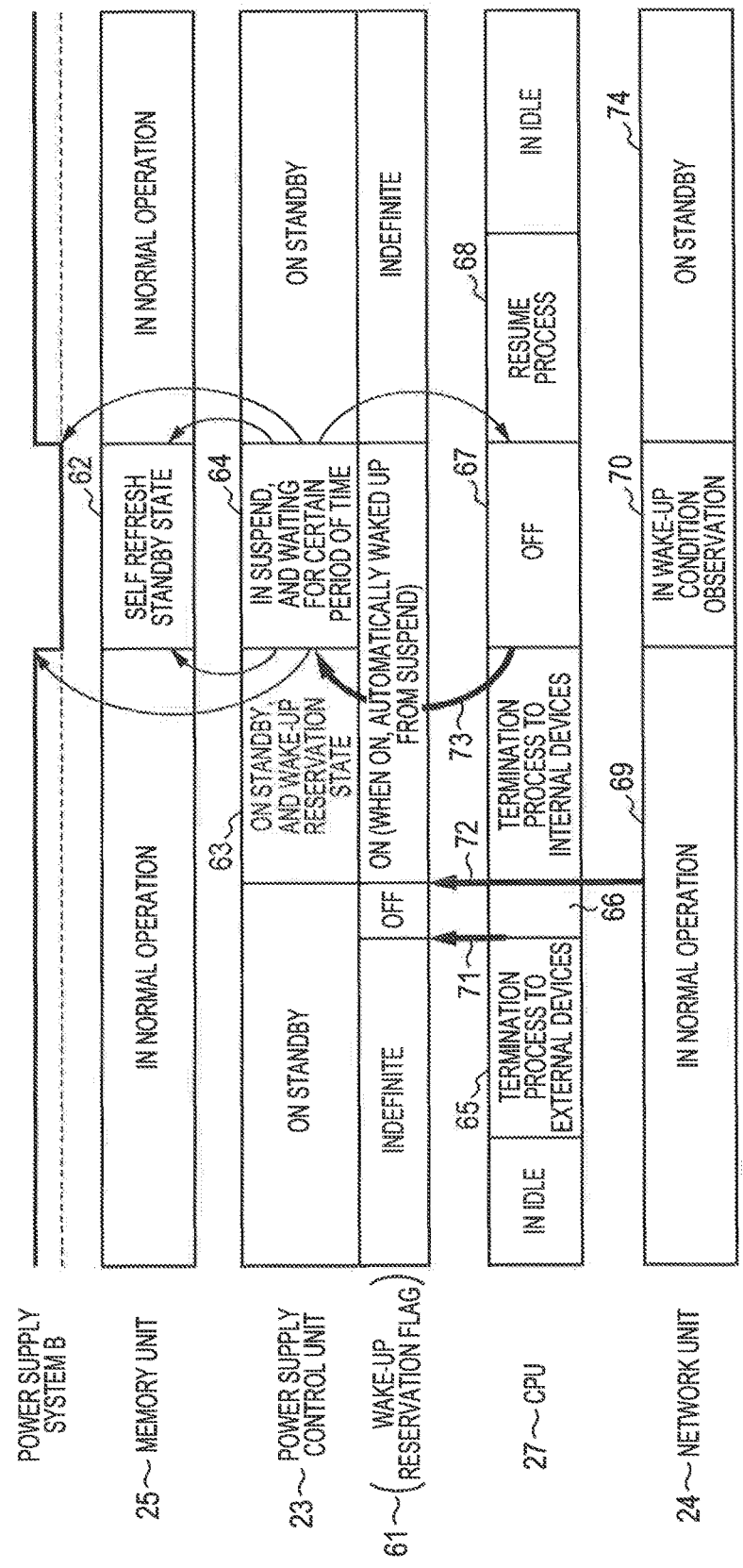
FIG. 6 is a diagram illustrating an example of a state of each device for every elapse of time.

FIG. 6 is a diagram illustrating an example of a state of each device for every elapse of time in the embodiment.

If there is no input from the input device 30 for a predetermined time or if the occurrence of such a predetermined power saving shift factor that the power supply switch unit 14 has been operated or the power saving button 29 has been depressed or the like is detected, the CPU 27 executes the suspend process (S300) shown in FIG. 3.

In S301, the CPU 27 executes a termination process of external devices such as printer unit 13, scanner unit 11, and the like. The external devices are devices connected to the external I/F. In FIGS. 1 and 2, the printer unit 13, scanner unit 11, and the like correspond to them. Among the external devices, there is also a device in which it takes a time to terminate. Therefore, while confirming whether or not a factor to cancel the suspend has occurred (S302), the CPU 27 continues the termination process of the external devices until the termination process of the external devices is completed (S301, S303) (state 65 in FIG. 6; termination process to external devices). In addition to a wake-up factor, which will be described hereinafter, a cancel factor designated by the CPU 27 as shown below is included in the cancel factor in S302. The cancel factor designated by the CPU 27 denotes such a factor that if the CPU 27 does not continue the process, an obstacle will occur. Therefore, when such a factor is detected, the CPU 27 determines that the cancel factor has occurred.

If it is determined that the cancel factor such as a job or the like has occurred from the network unit 24 during the termination process of the external device (in the case of YES in S302), the CPU 27 determines that the shift to the suspend is cancelled. Since the termination process has already been performed to several devices, a return process of all devices and a return completion are confirmed in S310 to S311, and thereafter, the CPU 27 executes, for example, the job serving as a cancel factor in S312 and cancels the suspend operation. Although not shown, if the suspend operation was cancelled, after completion of the execution of, for example, the job serving as a cancel factor, the CPU 27 again executes the suspend process (S300).

If it is determined that the termination process to the external devices has been completed without occurrence of the cancel factor (in the case of NO in S302 and YES in S303), the CPU 27 controls so as not to perform the suspend cancel and advances to S304.

In S304, the CPU 27 clears a wake-up reservation flag 61 stored in the power supply control unit 23 to "OFF" (event 71 in FIG. 6) and initializes a state to hold the occurrence of the wake-up factor for a period of time until the MFP will enter the suspend in future.

Subsequently, in S305, the CPU 27 executes the termination process to internal devices. In the example of FIGS. 1 and 2, the network unit 24, USB unit 31, HDD unit 26, image processing unit 28, and the like correspond to the internal devices. In the termination process to the internal devices, after the current state was held in the memory unit 25 with respect to each of the internal devices, the operation mode is changed from a mode under control management of the CPU 27 in which the operation is stopped in the suspend state so that the MFP operates independently even in suspend.

In the termination process to the internal devices, there is also such a process that it takes a time. Therefore, while confirming whether or not the wake-up factor has occurred (S306), the CPU 27 continues the termination process to the internal devices until the termination process to the internal devices is completed (S305, S308) (state 66 in FIG. 6; termination process to internal devices).

The internal devices are hardware connected to the CPU 27 through the bus as mentioned above and are devices arranged onto the same main board as that of the CPU 27. Unlike the external devices, since the internal devices cannot be accessed at the time of termination, it is necessary to strictly decide terminating order. In order to perform the stable operation as well, it is better that the halfway interruption as in the external devices is not performed. Therefore, until the termination process to the internal devices (S305) is started, if the suspend process can be interrupted (can be cancelled), when the termination process to the internal devices (S305) is started, the suspend process cannot be interrupted (cannot be cancelled).

Therefore, in the MFP 100 in the embodiment, if it is determined that the wake-up factor has occurred during the termination of the internal device (in the case of YES in S306), the wake-up request is reserved to the power supply control unit 23 (event 71 in FIG. 6) (S307) and the suspend process is continued. That is, if the event serving as a wake-up factor has occurred in a state where the halfway interruption of the suspend process cannot be performed, a resume process (return) is reserved.

It is assumed that as for the suspend process which is executed by the CPU 27, when the termination process to the internal devices (S305) is started, such a fact is notified to a protocol stack 57, a socket I/F 58, and an application 59 shown in FIG. 5, which will be described hereinafter. By this notification, during the termination process to the internal devices, an observation of the occurrence of the wake-up factor and a reservation of the return are performed in the protocol stack 57, socket I/F 58, and application 59. Even in the network unit 24, during the termination process to the internal devices, the observation of the occurrence of the wake-up factor and the reservation of the return are performed.

In the protocol stack 57, socket I/F 58, or application 59, if it is decided that the wake-up factor has occurred, a wake-up reservation flag 61 in the power supply control unit 23 is turned "ON" from the CPU 27. If it is decided that the wake-up factor has occurred in the network unit 24, the wake-up reservation flag 61 in the power supply control unit 23 is turned "ON" from the network unit 24 without intervention of the CPU 27. It is assumed that if it is determined that a predetermined request (for example, print request or response request) has been received from the network unit 24, the network unit 24, protocol stack 57, socket I/F 58, or application 59 determines that the wake-up factor has occurred, and processes such a request.

Further, even when there is an operation of the input device 30 of the operation unit 15 or there is a designated time alarm from an RTC (real-time clock) or the like as a clock unit (not shown), the occurrence of the wake-up factor is decided. The wake-up reservation flag 61 in the power supply control unit 23 is turned "ON" from the CPU 27. The power supply control unit 23 holds the wake-up reservation flag 61 even after the shift to the suspend. When the wake-up reservation flag 61 is turned "ON", the power supply control unit 23 enters a wake-up reservation state (state 63 in FIG. 6).

If it is determined that the termination process to the internal devices has been completed (in the case of YES in S308), the CPU 27 sends a suspend shift instruction to the power supply control unit 23 (event 73) and turns OFF the FET 20 through the power supply control unit 23. Thus, a power source of the power supply system B 21 is turned off and the MFP 100 is shifted to the suspend state.

Specifically speaking, the power supply control unit 23 which received the suspend shift instruction (event 73) shifts the memory unit 25 to a self refresh standby state (state 62 in FIG. 6) and shifts the network unit 24 to a wake-up condition observation state (state 70 in FIG. 6). Further, the power supply control unit 23 turns off the power supply system B 21, so that the CPU 27 is set to an OFF state (state 67 in FIG. 6). After that, the power supply control unit 23 enters the suspend state (state 64 in FIG. 6). This suspend state (state 64) is a state equivalent to the suspend state of the whole MFP controller unit 12.

Although the embodiment has been described with respect to the suspend method in which a value is held in the memory unit 25 itself, an effect similar to that in the suspend method can be obtained even in the hibernation method using the HDD unit 26 or a method in which an MRAM (magnetic random access memory) is used as a memory unit 25.

Only the devices included in the power supply system A 22 operate in suspend. In suspend, the network unit 24 observes whether or not the received packet is a packet which has to be returned from suspend (state 70; in wake-up condition observation). While observing the resume start, the power supply control unit 23 continues the suspend state. The power supply control unit 23 may be either a unit containing a CPU therein or a unit constructed by a dedicated hardware logic.

The operation in the suspend state (state 64, in suspend) of the power supply control unit 23 will be described with reference to FIG. 4.

Figure 4:
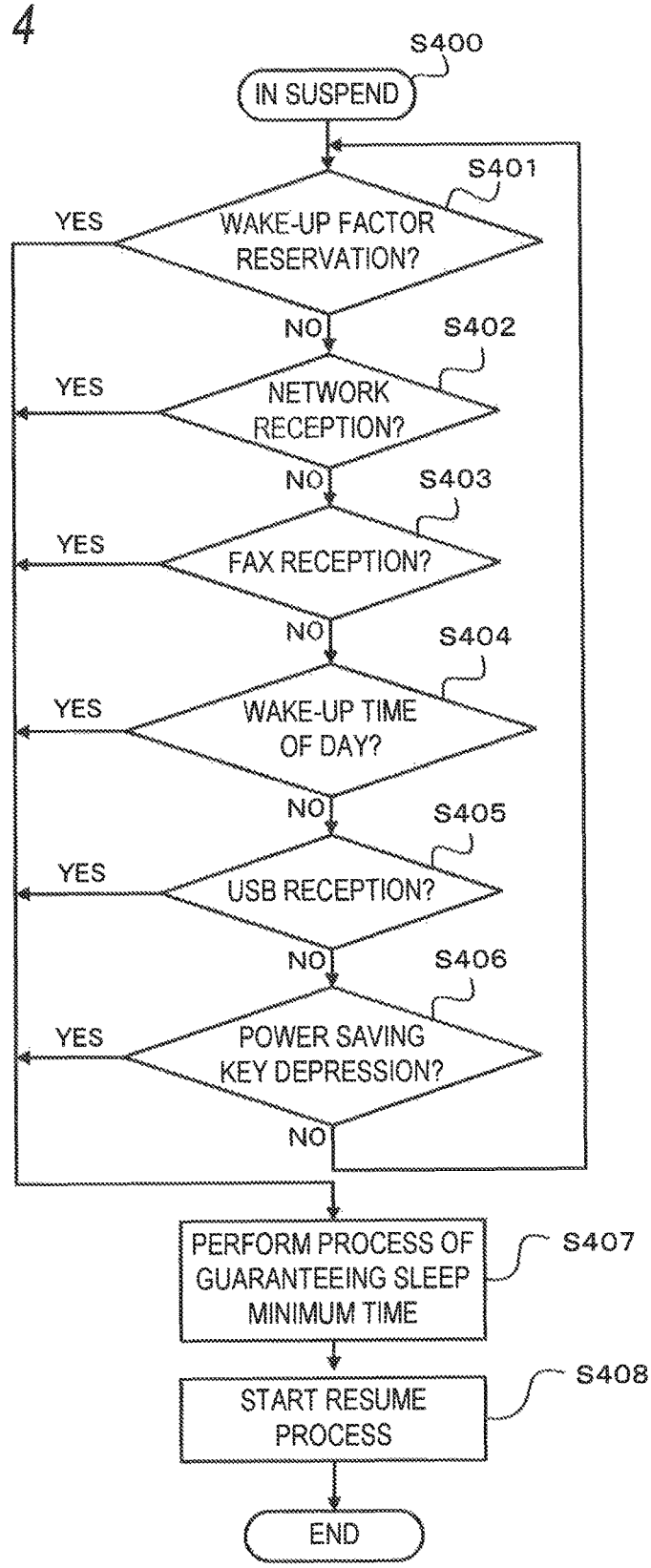
FIG. 4 is a flowchart illustrating an example of the operation in a suspend state.

FIG. 4 is a flowchart illustrating an example of the operation in the suspend state of the power supply control unit 23 in the embodiment. A process shown in FIG. 4 is realized either by a method whereby the CPU (not shown) of the power supply control unit 23 reads out a program recorded in a ROM or the like (not shown) and executes or by a dedicated hardware logic.

The power supply control unit 23 executes a process shown in S400 in suspend in which the power supply system B is OFF. In the process (S400) in suspend, the power supply control unit 23 observes the occurrence of any one of events shown in following S401 to S406.

In S401, the power supply control unit 23 confirms the presence or absence of the reservation of the wake-up factor (reservation of return). In the confirmation of the presence or absence of the reservation of the wake-up factor, when the wake-up reservation flag 61 stored in the power supply control unit 23 is "ON", it is determined that there is a reservation of the wake-up factor. The wake-up reservation flag 61 becomes a flag which is made operative as a trigger to start the resume immediately after the MFP entered the suspend state. As mentioned above, "ON" of the wake-up reservation flag 61 is set in a state where the interruption cannot be performed in the suspend process.

In S402, the power supply control unit 23 observes whether or not an effective resume start instruction such as job, inquiry, or the like has been received from the network unit 24 (observes whether or not the wake-up condition in the state 70 in FIG. 6 is true). In S403, the power supply control unit 23 observes whether or not such an effective resume start instruction that there is an incoming call from a facsimile unit (not shown) or the like has been received. In S404, the power supply control unit 23 observes whether or not there is a wake-up time alarm from the RTC (not shown). In S405, the power supply control unit 23 observes whether or not such an effective resume start instruction that a job was received from the USB unit 31 or the like has been received. In S406, the power supply control unit 23 observes whether or not the power saving button 29 or the power supply switch unit 14 has been depressed.

The power supply control unit 23 continues the foregoing observation until the occurrence of any one of the events shown in S401 to S406. When any one of the events occurs (in the case of YES in any one of S401 to S406), S407 follows.

In S407, the power supply control unit 23 executes a process for guaranteeing the minimum suspend time (process for guaranteeing the minimum time in suspend in order to avoid a reset inconvenience). In S408, the resume is started.

That is, in S408, the power supply control unit 23 turns on the FET 20, starts the current supply to the power supply system B 21, and cancels the reset to the CPU 27. After that, the CPU 27 sets the interruption state of each device held in the memory unit 25 at the time of suspend already described above into each device, thereby shifting to a state before the suspend is performed (state 68; resume process). For example, if the MFP is shifted to the suspend state in a state where the reception of the print job from the network has been completed, the MFP is shifted to the state before the suspend is performed and the print job which was received and held before shifting to the suspend state is executed. If the MFP is shifted to the suspend state in a state where the reception of the print job from the network is not completed, the MFP is shifted to the state before the suspend is performed, the print job which is transmitted again is received, and the print job is executed. If the retransmission of the print job has been finished due to a time-out or the like, the print job is lost.

At this time, the CPU 27 takes back control rights of the external interfaces such as network unit 24, USB unit 31, and the like to the CPU 27 (state 74; network unit 24 is in standby). That is, the MFP is returned to the normal state. Thus, the CPU 27 takes back all of the control rights of the MFP controller unit 12.

As mentioned above, if the event to be interrupted (wake-up factor) occurred on the way of entering the suspend (on the way of shift), the MFP 100 in the embodiment holds the flag state into the power supply control unit 23, thereby reserving the return, and enters the suspend as it is. By the return reservation, the MFP 100 automatically executes the resume operation after it entered the suspend, and can be returned to the normal state.

Subsequently, a judgment at the time of setting the wake-up reservation flag 61 to "ON" will be described.

Figure 5:
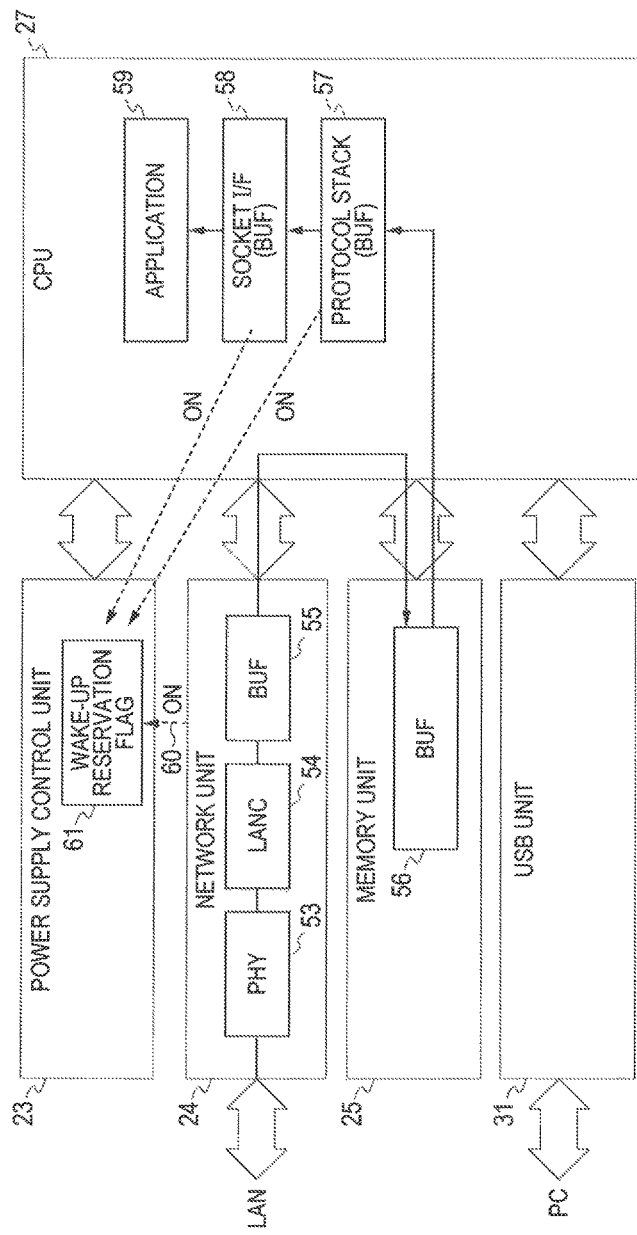
FIG. 5 is a diagram illustrating in detail an example of peripheries of a power supply control unit and a CPU (central processing unit).

FIG. 5 is a diagram illustrating in detail an example of peripheries of the power supply control unit 23 and the CPU 27.

An analog electric signal transmitted from an external PC (not shown) is converted into digital data by a PHY (physical layer) 53. On the basis of the converted digital data, an LANC (local area network controller) 54 forms a data packet. The formed data packet is stored through an internal BUF (buffer) 55 into a BUF 56 which is provided in the memory unit 25 and is constructed by, for example, a descriptor table.

For example, in the case of communication through Ethernet (registered trademark), the reception data is data of a unit called "Ethernet (registered trademark) frame". The reception data is analyzed by the software (protocol stack 57) called "protocol stack" on the basis of a predetermined communication procedure and is transmitted to the application 59 through the socket I/F 58 of, for example, TCP/IP (Transmission Control Protocol/Internet Protocol). The protocol stack 57 is a software module in which a series of communication protocol groups to realize computer communication has been installed. The protocol stack 57 has a communication processing function to process the reception data every protocol.

The application 59 is software for designating a socket, opening a line, and transmitting and receiving data to/from the socket I/F 58. The socket I/F 58 is a software module for transmitting and receiving data by using the socket. The socket I/F 58 mediates the data transmission and reception between the protocol stack 57 and the application 59. The application 59 analyzes the contents of the data received through the socket I/F 58 and discriminates whether or not its packet should be, for example, the wake-up request such as a job or the like.

The network is an interface which is being expanded and is notified to the application through buffers on a plurality of hardware as mentioned above and a buffer (its substance exists in the memory unit 25) formed by software.

The print job transmission by the protocol of TCP/IP will now be described as an example. As for such a small job that can be enclosed in a window size (size of data which can be received in a lump) of the protocol stack of TCP/IP, a transfer of TCP/IP is perfectly completed in a state where such a job exists in the protocol stack 57 (its substance exists in the memory unit 25). Therefore, a host PC (not shown) of a transmitting source of the print job regards the end of transmission at this point of time and enters a "print completion" state.

However, the application 59 merely issues a reception request to the socket I/F 58 and in the state where the data exists in the protocol stack 57 as mentioned above, the application 59 cannot detect the reception itself of the print job. That is, in such a state, the event (cancel factor) of S302 in FIG. 3 does not occur in the application 59.

When the termination process to the external devices is finished (YES in S303) in such a state, the MFP enters the termination process to internal devices (S305), so that the MFP 100 enters a state where it cannot be returned on the way of the operation. That is, even if the job exists in the memory, the MFP 100 is shifted to the suspend state.

In the state where the MFP 100 is shifted to the suspend state as mentioned above, if a network packet serving as a wake-up factor is transmitted from the host PC to the MFP 100, in the MFP 100, the condition of S402 in FIG. 4 is accomplished and the resume operation is started. Thus, in the MFP 100, the job which was suspended in a state where it is held in the memory is processed.

However, since a discrimination about whether or not such a packet is transmitted depends on the specifications of the transmitting source locating on the destination side of the external I/F, it is not guaranteed. If such a packet is not transmitted, there is a possibility that the foregoing job is not processed while keeping the suspend state.

For example, in the case of a job which is completed by one packet of Ethernet (registered trademark), it is not guaranteed that the next packet is transmitted, and a case where the MFP enters the suspend in a state where the job packet exists in the buffer 55 is also considered. In this case, according to the software of the CPU 27, even if any method is used, such a job cannot be detected. Therefore, in the embodiment, a reservation of return using the wake-up reservation flag 61 is made.

As mentioned above, the ON operation of the wake-up reservation flag 61 is effective on the way of the suspend process, that is, until completion of the suspend from the timing when the suspend cannot be cancelled. In other words, in the flowchart of FIG. 3, the ON operation of the wake-up reservation flag 61 is effective only for a period of time (interval of the state 66) between S305 to end.

The ON operation of the wake-up reservation flag 61 will be described hereinbelow.

(A) The ON operation of the wake-up reservation flag 61 by the network unit 24 will be described. In order to save a possibility that the packets are accumulated in the buffer 55, the network unit 24 observes the packet serving as a wake-up factor. If it is determined that the wake-up factor has occurred, an interruption line 60 is asserted, thereby setting the wake-up reservation flag 61 into the power supply control unit 23. In this case, the event 71 is notified to the power supply control unit 23 by the interruption line 60 without intervention of the CPU 27. Thus, in the power supply control unit 23, the wake-up reservation flag is turned "ON" and the MFP is in standby and enters the wake-up reservation state. If all packets are asserted as targets, a wake-up reservation is also made in a broadcast, an ARP (Address Resolution Protocol) packet, or the like. Therefore, in the network unit 24, a packet such as job, SNMP (Simple Network Management Protocol), or the like which needs a response instead of the broadcast, ARP packet, or the like is discriminated and the interruption line 60 is asserted, so that the more accurate wake-up reservation can be made.

(B) The ON operation of the wake-up reservation flag 61 by the protocol stack 57 will be described. Generally, the protocol stack 57 exists in a library in the kernel. The protocol stack 57 is constructed by connecting protocols of the network such as IP, TCP, and the like in a stack manner and each protocol has an independent temporary buffer. Information which can be discriminated differs in accordance with a layer of the stack. As a most general stack, there is a TCP port number of a TCP protocol stack. It is such a technique that communication can be multiplexed by such a sparse coupling promise that both of the transmitter and receiver use an arbitrary number. There is such a regulation that an RAW port and an LPR (Line PRinter daemon protocol) port which are used to print are 9100 and 515 and the like. Although there is such a process that a port number is discriminated in the protocol stack and is allocated to an arbitrary port, and at this point of time, it is possible to determine that the data is probably the print job. By the reception from the outside, the kernel of the CPU 27 executes a receiving process. In this protocol stack, the CPU 27 issues an event 72 and notifies the power supply control unit 23 of it. Thus, the power supply control unit 23 turns on the wake-up reservation flag and the MFP is in standby and enters the wake-up reservation state. In this manner, the protocol stack 57 issues a command of the CPU 27 to set the wake-up reservation flag 61 in accordance with the port number, so that the wake-up reservation can be made by the necessary data reception.

(C) The ON operation of the wake-up reservation flag 61 by the socket I/F 58 will be described. The socket I/F 58 is a mechanism to multiplex the data transmission and reception of the kernel. There is a case where this layer has a buffer by a data multiplexing method of a sparse coupling type similar to that of the above-described port. There is also a case where by changing a virtual memory mapping, a pointer is handed. The application 59 receives data of an arbitrary port of, for example, TCP through the socket of the kernel. As for the socket, a use field is almost determined every socket. Therefore, at a point of time when the data can be obtained from the socket such as a print use or the like, the socket I/F 58 issues the command of the CPU 27 so as to set the wake-up reservation flag 61, so that the wake-up reservation can be made by the necessary data reception.

Even in the application 59, it is also possible to construct in such a manner that when it is determined that the wake-up factor has occurred, the command of the CPU 27 is issued so as to set the wake-up reservation flag 61 at this point of time, and the wake-up reservation is made.

Although the construction using all of the foregoing (A), (B), and (C) has been shown in the above description, all of them may be used or any of them may be selectively used. In each layer of the foregoing (A), (B), and (C), a time which is required until the data is transferred to the application 59 differs, and a size of buffer which can temporarily hold the data also differs. In each layer, an analyzing method of the packet data differs, and such a difference exerts an influence on the reliability of judgment about the wake-up factor. Since those judgments are general in the network, their detailed description is omitted. However, in a system in which a CPU is provided in the network unit 24 and a network response in suspend is performed, by using the judgment of (A), a maximum advantage of the power saving is obtained.

In the foregoing embodiment, the power saving mode by the suspend for turning off the CPU 27 has been shown. However, in sleep control of Wait For Interrupt type for shifting the CPU 27 to an interrupt standby state (dose mode) or the like, by using the judgment of (B), a system of the highest reliability can be constructed. In this manner, it is sufficient to select one of (A), (B), and (C) in accordance with the construction, necessary reliability, and electric power.

There is also a case where if the application 59 does not receive the reception data of a certain amount such as PDL data or the like, the job cannot be discriminated. In such a case, at a point of time when the application 59 starts the data reception from the socket I/F 58, the socket I/F 58 issues the command of the CPU 27 to set the wake-up reservation flag 61, so that the wake-up reservation can be made by the necessary data reception.

As described above, in the MFP 100 of the embodiment, such an obstacle that the MFP enters the suspend on the way of process of the inquiry, job, or the like from the outside occurring just when the MFP enters the suspend and does not wake-up as it is can be avoided. In the embodiment, in such a case, the MFP enters the suspend as a wake-up reservation state 63 and the resume process (state 68 in FIG. 6) is automatically started from the state in suspend and waiting for certain period of time (state 64 in FIG. 6).

As an example of the return reservation based on the reception in the external interface, the return reservation in the case where the data is received by the network unit 24 has been described above. However, it is also possible to construct in such a manner that data is received by another external interface and the return reservation is made. For example, it is also possible to construct in such a manner that data is received by the USB unit 31 and the return reservation is made.

The USB unit 31 is also a typical block device. Since the USB unit 31 and the CPU 27 have almost the same buffer construction as that in the case of the network unit 24 and the CPU 27, their detailed description is omitted. In the invention, the specific external interface devices are not limited to the network unit 24, the USB unit 31, and the like but other external interface devices may be used. For example, it is also possible to construct in such a manner that data is received by another external interface such as Bluetooth, infrared rays, Thunderbolt, or the like (not shown) and the return reservation is made. The invention may use another construction in which the wake-up reservation is set from hardware of the external interface or a state of the buffer for processing the data received from the external interface is observed in a software manner and the wake-up reservation is made.

In the foregoing embodiment, the construction in which the wake-up reservation flag 61 is held in the power supply control unit 23 has been shown. However, the wake-up reservation flag 61 may be held out of the power supply control unit 23. The wake-up reservation flag 61 may be stored anywhere so long as it is a storage area which can be read out by the power supply control unit 23 in the suspend state.

Although the construction in which the return reservation is made by using the wake-up reservation flag 61 has been shown, the return reservation may be made by another method. For example, if the return factor occurred in a state where the suspend process cannot be interrupted, a sleep minimum time may be set into the real-time clock at the timing when the process to internal devices is terminated or the like and the power supply system B may be turned off.

As shown above, the MFP 100 is constructed in such a manner that when an event is received from the external interface just when the MFP enters the suspend mode, after the MFP entered the suspend mode once, the MFP is automatically activated so as to wake-up, and after the MFP was automatically activated from the suspend, the event is continuously processed. By this construction, the occurrence of such a phenomenon that while the event is received from the external interface just when the MFP enters the suspend mode, the process itself of such an event is held in suspend can be suppressed. Thus, a request received from the outside immediately before the MFP is shifted to the power saving state such as a suspend state or the like can be automatically processed without annoying the user.

Further, in the image forming apparatus in the related art, immediately before the MFP enters the suspend mode, even in the case where there is a user operation or there is a designated time alarm or the like from the RTC, the MFP is shifted to the suspend mode as it is irrespective of the user's intention. However, in the MFP of the embodiment, even if there is a key operation of the operation unit 15 or there is a designated time alarm or the like from the RTC (not shown) just when the MFP enters the suspend mode, after the MFP entered the suspend mode once, the MFP is automatically activated so as to wake-up. By this construction, the occurrence of such a phenomenon that the MFP is shifted to the suspend mode irrespective of the user's intention can be suppressed.

Although the image forming apparatus (MFP) has been described above as an example in the embodiment, the invention can be applied to another apparatus so long as it is an information processing apparatus which can operate while switching a plurality of electric power states and can receive a job by an external interface.

The foregoing constructions of the various kinds of data and their contents are not limited to those mentioned above but, naturally, the various kinds of data may have various kinds of constructions and contents in accordance with use objects.

Although the embodiment has been shown above, the invention can be also embodied as, for example, a system, an apparatus, a method, a program, a storage medium, or the like. Specifically speaking, the invention can be also applied to a system constructed by a plurality of apparatuses or may be applied to an apparatus constructed by one equipment.

All of constructions in which the foregoing embodiments are combined are also incorporated in the invention.

Other Embodiments

The invention is also realized by executing the following processes. That is, software (program) for realizing the functions of the foregoing embodiments is supplied to a system or apparatus through a network or various kinds of storage media and a computer (or a CPU, MPU, or the like) of the system or apparatus reads out the program and executes processes based on the program.

The invention may be applied to a system constructed by a plurality of apparatuses or may be applied to an apparatus constructed by one equipment.

The invention is not limited to the foregoing embodiments but various modifications (including organic combinations of the embodiments) are possible on the basis of the essence of the invention. They are not excluded from the scope of the invention. That is, all of constructions in which the foregoing embodiments and their modifications are combined are also incorporated in the invention.

Embodiments of the present invention can also be realized by a computer of a system or apparatus that reads out and executes computer-executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer-executable instructions from the storage medium to perform the functions of one or more of the above-described embodiment. The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131321, filed on Jun. 24, 2013, which is hereby incorporated by reference herein in its entirety.

What is claimed is:

1. An information processing apparatus which can be shifted between a first power state and a second power state, comprising:
   a network controller configured to receive data from an external device via a network;
   a processor unit configured to process the received data; and
   a power supply controller configured to control a power supply to the processor unit so that power is supplied to the processor unit in the first power state but is not supplied to the processor unit in the second power state,
   wherein the network controller and the power supply controller are connected to each other via a signal line,
   wherein the network controller is configured to input, in a case where a predetermined type of data is received by the network controller from the external device in the shift of the information processing apparatus from the first power state to the second power state, a signal to the power supply controller via the signal line in accordance with the reception, and
   wherein the power supply controller is configured to set predetermined data based on the input of the signal, and, after the information processing apparatus come to be in the second power state by the shift, to restart the power supply to the processor unit based on the set predetermined data, so that the processor unit processes the predetermined type of data received in the shift.

2. The information processing apparatus according to claim 1, wherein
   the network controller is configured with memory, and
   the network controller is configured to set the predetermined data to the memory based on the input of the signal, to determine whether or not the predetermined data has been set after the information processing apparatus comes to be in the second power state by the shift, and to restart the power supply to the processor unit based on the determination that the predetermined data has been set.

3. The information processing apparatus according to claim 1, wherein
   the processor unit is configured to perform a shift process for the shift.

4. The information processing apparatus according to claim 1,
   wherein:
   the shift includes a first-stage shift, and a second-stage shift after the first-stage shift,
   in a case where the predetermined type of data is received by the network controller in the first-stage shift, the processor unit is configured to cancel the shift and process the predetermined type of data in accordance with the reception, and
   in a case where the predetermined type of data is received by the network controller in the second-stage shift, the network controller is configured to input the signal to the power supply controller via the signal line in accordance with the reception, the power supply controller is configured to set the predetermined data based on the input of the signal, and the power supply controller is configured to restart the power supply to the processor unit based on the set predetermined data after the information processing apparatus comes to be in the second power state by the shift, and the processor unit for which the power supply is performed by the restart is configured to process the received predetermined type of data.

5. The information processing apparatus according to claim 4, wherein, even if the predetermined type of data is received by the network controller in the first-stage shift, the network controller is configured not to input the signal to the power supply controller via the signal line.

6. The information processing apparatus according to claim 4, further comprising a printer unit to which power supply is performed in the case where the information processing apparatus is in the first power state, whereas the power supply is not performed in the case where the information processing apparatus is in the second power state,
   wherein, when the first-stage shift is completed, the power supply controller is configured to stop the power supply to the printer unit while maintaining the power supply to the processor unit, and wherein, when the second-stage shift is completed, the power supply controller is configured to stop the power supply to the processor unit.

7. The information processing apparatus according to claim 1, wherein the predetermined type of data is print job data.

8. The information processing apparatus according to claim 1, wherein, even if the processor unit does not detect the reception of the predetermined type of data in the shift, the network controller is configured to be able to input the signal to the power supply controller via the signal line.

9. A method for controlling an information processing apparatus which is being shifted from a first power state to a second power state, wherein the information processing apparatus has a processor unit, a network controller, and a power supply controller which controls a power supply to the processor unit and is connected to the network controller with a signal line, the method comprising:

receiving, by the network controller, a predetermined type of data from an external device in the shift of the information processing apparatus from the first power state to the second power state;

inputting, by the network controller, a signal to the power supply controller via the signal line in accordance with the reception;

setting, by the network controller, predetermined data based on the input of the signal;

stopping, by the power supply controller, power supply to the processor unit in accordance with the shift;

restarting, by the power supply controller, power supply to the processor unit based on the set predetermined data, after the information processing apparatus comes to be in the second power state by the shift; and processing, by the processor unit to which power supply is restarted, the received predetermined type of data.

* * * * *